United States Patent [19]

Sosnowski

[11] Patent Number: 4,580,487
[45] Date of Patent: Apr. 8, 1986

[54] LOW ENERGY DEMAND STRUCTURE

[76] Inventor: Leon Sosnowski, 62 Wegman St., Auburn, N.Y. 13021

[21] Appl. No.: 746,348

[22] Filed: Jun. 19, 1985

[51] Int. Cl.$^4$ ................................................ F24F 7/00
[52] U.S. Cl. .......................................... 98/31; 52/303; 126/400; 126/428; 165/56
[58] Field of Search .................. 165/45, 49; 98/28, 31, 98/32, 33, 33 R, 88.1, 87, 103; 126/428, 429, 400, 432, 430, 431; 52/303, 304, 305, 302; 237/2 B, 69

[56] References Cited

U.S. PATENT DOCUMENTS

| | | | |
|---|---|---|---|
| 1,086,031 | 2/1914 | Davis | 52/216 |
| 2,204,583 | 6/1940 | Falls | 52/303 |
| 3,500,596 | 3/1970 | Andersson | 52/79.7 |
| 3,576,157 | 4/1971 | Sebald | 98/31 |
| 3,664,076 | 5/1972 | McCoy | 52/264 |
| 3,929,186 | 12/1975 | Becker | 98/31 |
| 3,983,670 | 10/1976 | Lightfoot | 52/220 |
| 4,127,973 | 12/1978 | Kachadorian | 52/169.11 |
| 4,189,878 | 2/1980 | Fitzgerald | 52/95 |
| 4,279,112 | 7/1981 | Bertrand | 52/741 |
| 4,295,415 | 10/1981 | Schneider, Jr. | 98/31 |
| 4,296,798 | 10/1981 | Schramm | 165/56 |
| 4,523,519 | 6/1985 | Johnson | 98/31 |

*Primary Examiner*—James C. Yeung
*Attorney, Agent, or Firm*—Bradford E. Kile

[57] ABSTRACT

Low energy demand structure with side walls, roof, and foundation is disclosed wherein the side walls have inner and outer structures, the outer structure of frame construction with very heavy insulation substantially filling the outer structure. The inner surface of the outer wall structure is provided with a panel cover to hold the insulation in place and over the panel a moisture impermeable seal is placed. The inner wall structure is of vertical frame construction and provides circulating air passages and a finish interior surface. The ceiling is of similar structure with the circulating air passages of the ceiling and walls in communication with each other. The upper portion of the structure rests on foundation walls which extend at least 3-4' below the frost line and which are faced with rigid foam insulation also extending 3-4' below the frost line. A lowermost floor slab of concrete, which is usually the basement floor, has circulating air passage formed therein which are in communication with the air passages of the side walls or inner basement walls which, if present, are of hollow construction with air passages therein and the inner and outer basement walls are separated by a moisture impermeable vinyl sheeting and similar sheeting is placed between the floor slab and the underlying earth mass.

5 Claims, 4 Drawing Figures

LOW ENERGY DEMAND STRUCTURE

BACKGROUND OF THE INVENTION

Field of the Invention

The present invention is concerned with building structures and, more particularly, with residential building structures.

Recently, with the shortage of petroleum and the sharply increased costs of other fuels employed in heating buildings as well as the rapid increase in the cost of electrical energy in most areas of the country, significant attention has been directed to developing building structures that are more efficient in their utilization of energy for heating and cooling. In addition, alternative sources such as solar energy for heating and providing hot water have seen significant development in recent years. Greater use has been made of extensive insulation of buildings, storm sashes, and various techniques for making the structures more weathertight.

While all of the foregoing approaches have advantages, they all have significant limitations either in cost or in effectiveness.

Utilization of solar energy adds to the original cost of construction since supplemental heating units are generally required because of the general inability of solar energy arrangements to provide sufficient heat input in high demand times to adequately heat structures. Solar energy is also unreliable as a primary heat source due to the weather interrupting the flow of energy from the sun to the collectors of the system and the bulkiness of energy storage in solar heating systems. In addition, solar energy does not provide a direct means of cooling structures in the summer other than as a source of energy to generate electricity, and with the present technology it is not an efficient means of generating electrical energy.

The widespread use of insulation has helped to inhibit heat loss or heat input to the building structure as the case may be. In the case of most residential structures, insulation is put into the interior of a single structural wall having external siding and sheetrock or plaster interior surface and placed in open rafters above the ceiling on the topmost floor of the structure. Storm sashes and various combinations of double glazing have been utilized to inhibit the generally enormous heat loss through window openings. The openings for electrical outlets, plumbing, windows and the like on the interior faces of the walls provide many sources for air leaks causing drafts as well as variations in the humidity content of the interior of the house because of significant "breathing" of the structure.

In the case of residential structures having basements, the basements are often unheated and there is no insulation provided on the walls and this is consequently a source of dampness and heat loss. Some attempts have been made to either insulate the bottom floor or insulate the basement walls. These approaches have all met with varying degrees of success but have presented problems with cost and moisture control.

Up until the present time, no attempt appears to have been made to construct a building which effectively utilizes the stabilized energy level of the earth mass as a source of energy to provide heat and cooling to the structure and to stabilize the temperature thereof.

While there are no prior art references known which teach the energy-sufficient structure of this application or suggest its structure, the following patents represent the most closely related prior patents known to the Applicant which disclose structures of background interest.

U.S. Pat. No. 3,664,076 McCoy discloses a prefabricated structure for walls, floor and ceiling comprised of an insulated filling having an inner surface skin and an external skin. In effect, the insulation bulk also comprises the structural elements of the building. It also includes the bottom layer or flooring cross section. The structure, thus includes insulation on all sides, top and bottom.

U.S. Pat. No. 3,983,670 Lightfoot relates to a partition system wherein in the base of a partition comprises a hollow channel for accomodating various services for the building such as wiring, piping, etc. The partition structure is of the modular type and the channel eliminates the necessity for forming custom openings in the partition for outlets, swtiches, etc.

U.S. Pat. No. 3,500,596 Andersson discloses a prefabricated building having roof, walls and bottom comprised of an outer corrugated metal structure having inner and outer corrugated walls spaced from each other, the outer serving as a facade or for receiving a facade for the house and the inner surface adapted to have a facade secured to it in the form of sheetrock, paneling or the like. The inner and outer corrugated walls have insulation material in between them and the spaces defined by the corrugations of the inner wall to which the facing panels are attached may serve as distribution channels for the flow of warm or cooling air as well as wiring channels and piping channels.

U.S. Pat. No. 4,189,878 Fitzgerald discloses a house roof insulation vent wherein provision is made to insure the flow of air through perforated openings in the soffit of the house up and over the top of the insulation layer on the rafters of the dwelling.

U.S. Pat. No. 4,279,112 Bertrand relates to an improved method of insulating a building having a rigid metallic frame structure and is of interest only for including of an inner layer of waterproof vinyl on the inside surfaces of the insulation material of the structure in order to diminish the possibility of water condensation and to improve the thermic insulation of the building as well. The vinyl layer serves as a means to further reduce the drafts due to minor openings and gaps in the main insulation.

SUMMARY OF THE INVENTION

The present invention provides a building structure which demands very little use of fuel generated energy for either heating or cooling in the temperate zones, and which includes moisture control elements.

The structure in general is comprised of side walls, roof, and foundation or basement walls, and a lowermost floor of concrete slab. The side walls are made of an inner and outer wall. The outer wall is the main structural wall of frame construction with exterior siding on its outer surface.

Framing in which the studs do not extend directly from the inner to outer surfaces is preferred in order to decrease conduction of heat or cold. Staggered offset studding or its equivalent is employed to assure that maximum insulation effect is obtained. The outer wall is thicker than usual, about 8"–12" in order to provide sufficient space for substantial amounts of insulation preferably to obtain the equivalent of at least R-40 insulation.

The inner side of the outer wall is covered with a material such ⅛" masonite or the like in order to retain the insulation within the outer wall frame.

A similar inner surface covering is provided on the inner surface of the ceiling joists over which batts or loose insulation of R-80 rating are placed.

While the structure of the present invention may employ lower rated insulation, the values given are preferred for best results. In addition to the heavy insulation in the framework of the side walls, insulation on the sides is extended to the base of the foundation walls. The insulation on the foundation walls is preferably a foam insulation. In most cases, a rigid closed cell foam slab such as styrofoam slab 4" thick insulation layered to 8"-12" thick is preferred. Generally, it is placed in multiple 4" lamination on the exterior of the foundation structural wall of concrete block or poured concrete and, in turn, is covered by a face coating of cement stucco. The insulation on the foundation basement walls should extend at least three, and preferably four feet, below the average frostline depth in the geographical area where the building structure is erected. In addition, treated lumber basements are included in the above design as an option.

The inner surface of the outer wall, the ceiling, foundation-basement wall, as well as the top of the gravel or like base for the lowermost floor under the concrete slab are covered with a vapor barrier of moisture impermeable plastic sheeting such as 1-6 mil. thick vinyl. The interior surface of the outer wall structure thus is provided with a continuous vapor barrier to facilitate control of the moisture content of the building structure.

Inside of the moisture barrier in the structure there is provided an inner finish ceiling and wall surface of plaster sheetrock, paneling or the like, mounted on framing studs, with the spacing between the vapor barrier and the inner wall finish surface defining passeways to circulate fresh heating and cooling air, and to place utility distribution systems and outlets, without penetrating the moisture seal and insulation of the outer structure. The building structure is thus not allowed to "breathe" in an uncontrolled manner.

The circulatory air passages in the inner wall structure are in open communication with air passageways built into the basement or ground level floor slab. The air passages also may be connected to ancillary heating or cooling air sources if such are employed. Circulation pumps preferrably are provided to maintain positive circulation. The conductive and radiation flow of thermal energy goes to or comes from the earth mass to the lowermost floor slab with its air passages therein which are in circulating communication with the inner walls and ceiling of the structure from about 68° F. to about 78° F., without the employment of auxillary heating or cooling units in most temperate zones.

It is preferable that absolute filters be used, but electronic air cleaners can also be utilized, also, a fresh air damper controls access to outside air, and moisture control units will be employed. Stale inside air is eventually vented to the outdoors. Ideally, to further increase the efficiency, automatic thermal shutters for windows may be employed to provide additional insulation over windows at night and/or shade them from sun in the summer.

The low energy demand house of this invention is temperature controlled almost exclusively through the flow of thermal energy to and from the vast mass of the underlying earth. The design of double wall and ceiling structure, the outer structure with extra thick insulation, and the inner frame ceiling and wall structures separated by a moisture impermeable barrier from the outer structure, which barrier extends under the basement floor, moisture seals the structure to prevent "breathing" of the interior of the structure, and allows dependence upon the earth mass as the almost exclusive source for stabilizing temperature control for the structure.

In another embodiment of the instant invention, miniature heat pump units may be located within the outer wall structure coupled to the air passageways and vented outdoors for auxiliary heating purposes.

The utility services, plumbing, and others are all located within the interior walls and ceiling interior of the moisture barrier.

The present invention thus provides a low energy demand structure particularly suitable for residential or office use which utilizes the conductive and radiation flow of thermal energy to and from the underlying earth mass as the primary means of heating and cooling, with or without auxiliary miniature heat pump units located within the outer walls of the building structure.

BRIEF DESCRIPTION OF THE DRAWING

In the accompanying drawing which forms a part of the specification.

DESCRIPTION OF ILLUSTRATIVE EMBODIMENT

Figure 1:
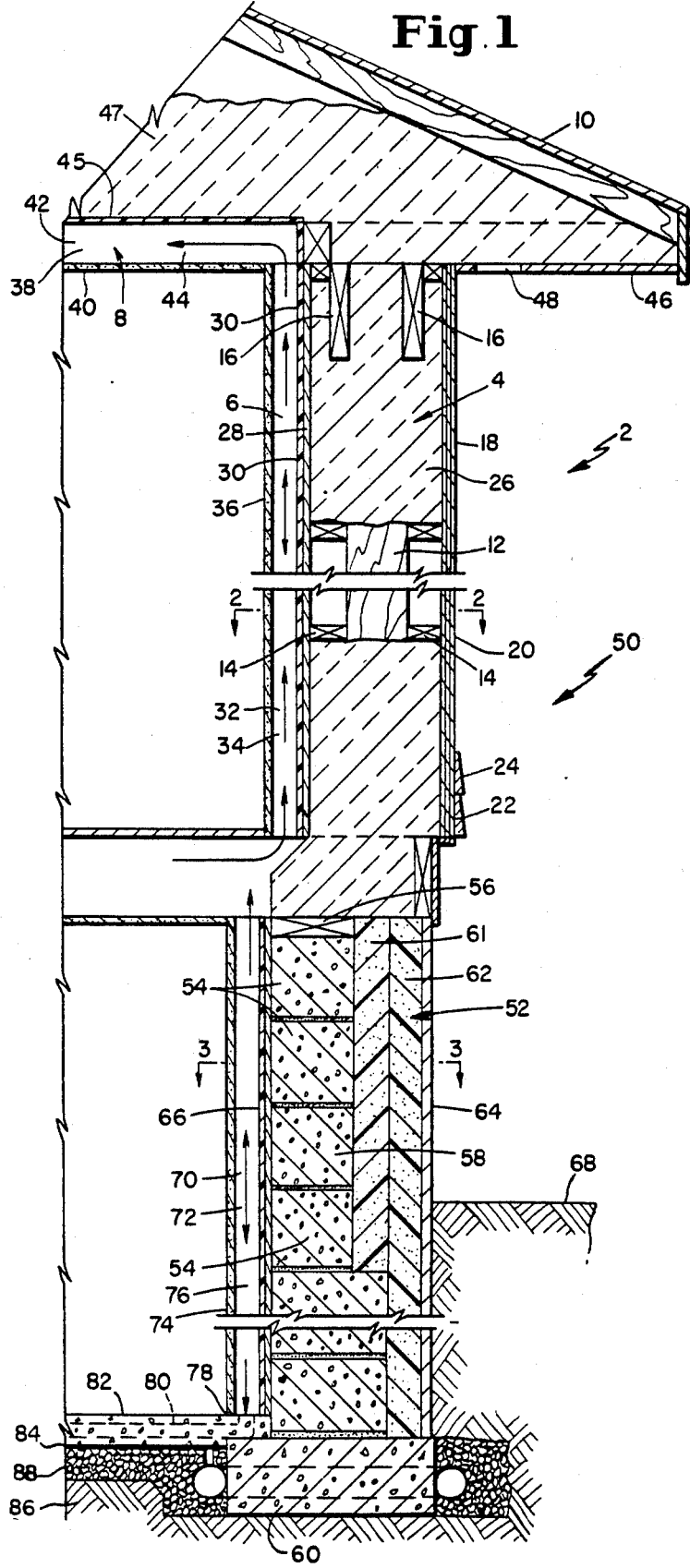
FIG. 1 is a partial sectional view of the structure according to the invention showing the arrangement roof and ceiling walls, floor, basement wall and floor, and relationship to the underlying earth.
Figure 2:
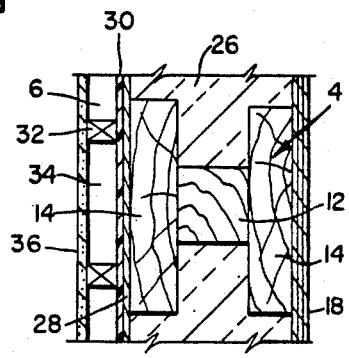
FIG. 2 is a sectional view along line 2—2 of FIG. 1.
Figure 3:
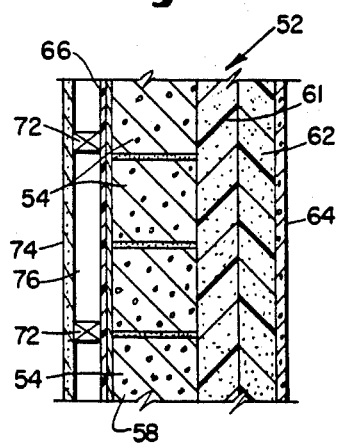
FIG. 3 is a sectional view along line 3—3 of FIG. 1.

In the accompanying drawing, a building structure according to the present invention is shown generally at 2. It has an outer wall structure 4 and an inner wall structure 6 and a ceiling structure 8 with a conventional type of roof 10. The outer wall structure 4 is comprised of vertical centrally located stud members 12, 4" by 4" in cross section with longitudinal stringers 14 and headers 16 constructed to provide a wall one foot thick. The exterior 18 of the outer wall 4 is provided with exterior plywood sheathing 20 or other standard sheathing and finish surfacing 22 which in the embodiment shown is cedar shakes 24. Within the outer wall 4 is heavy insulation of R-40 indicated by 26. The inner surface of the outer wall 4 is a ¼" thick masonite sheet 28. The inner surface of the masonite sheet is covered with a 2-6 mil. thick moisture impermeable vinyl plastic sheet 30.

The inner wall 6 is comprised of vertical studding 32 of 2"×3"'s which provides not only framing for the inner wall structure but forms passages 34 for circulating air and space for building utilities such as electrical wiring and plumbing. The interior surfaces 36 of the inner wall structure are comprised of sheetrock.

The ceiling 8 is constructed in a similar manner with the framing 38 supporting sheetrock 40 and defining circulating air passages 42 in communication with the vertical air passages 34 of the interior wall.

The vinyl sheeting 45 forms an impermeable moisture barrier or seal below the thick R-80 roof insulation 47.

The soffit 46 of the roof 10 is provided with circulating opening 48 to permit outside air to circulate over the top of the roof insulation 42 in the usual manner.

The upper portion 50 of the structure 2 rests on foundation 52 comprising concrete blocks or treated wood frame 54 with top plate 56 forming the outer basement or foundation wall 58. The wall 58 rests on footings 60. The outside of the wall 58 is faced with two layers of styrofoam closed cell rigid foam insulation 61 and 62, each of which is 4" thick and 2'×4'. A face coating 64 of ½ to 1" cement stucco is placed on the exterior side of the insulation 62.

The wall 58 extends well below the frostline indicated at 68a, and the foam insulation 62 on the wall 58 should extend at least three and preferably at least four feet below the frost line.

The interior of the wall 58 is faced or covered with the vinyl sheeting 66 and the interior frame wall 70 of the vertical studs 72 and sheetrock facing 74. The frame wall 70 also defines air passageway 76 in communication with the passageways 34 of the inner wall 6 and at the lower end 78 with air passageways 80 forms in the concrete floor slab 82 which is the lowermost floor of the structure 2.

Vinyl sheeting 84 is placed between the slab 82 and the underlying earth mass 86 and the gravel base 88. The earth mass 86 is thus in conductive thermal contact with the slab 82 and will maintain the temperature of the structure between 68° F. and 78° by the flow of the thermal energy to or from the slab 82 which transfers the energy throughout the structure 2 by circulating air through passages 76-34-42. Blowers may be used to assure more positive continuous circulation. The structure 2 can be maintained at livable temperature simply through the exchange of thermal energy with the earth mass through contact with the lowermost slab within the perimeter of the foundation wall which wall is insulated to a depth of three or four feet below the frostline, indicated at 68a, in the earth.

Figure 4:
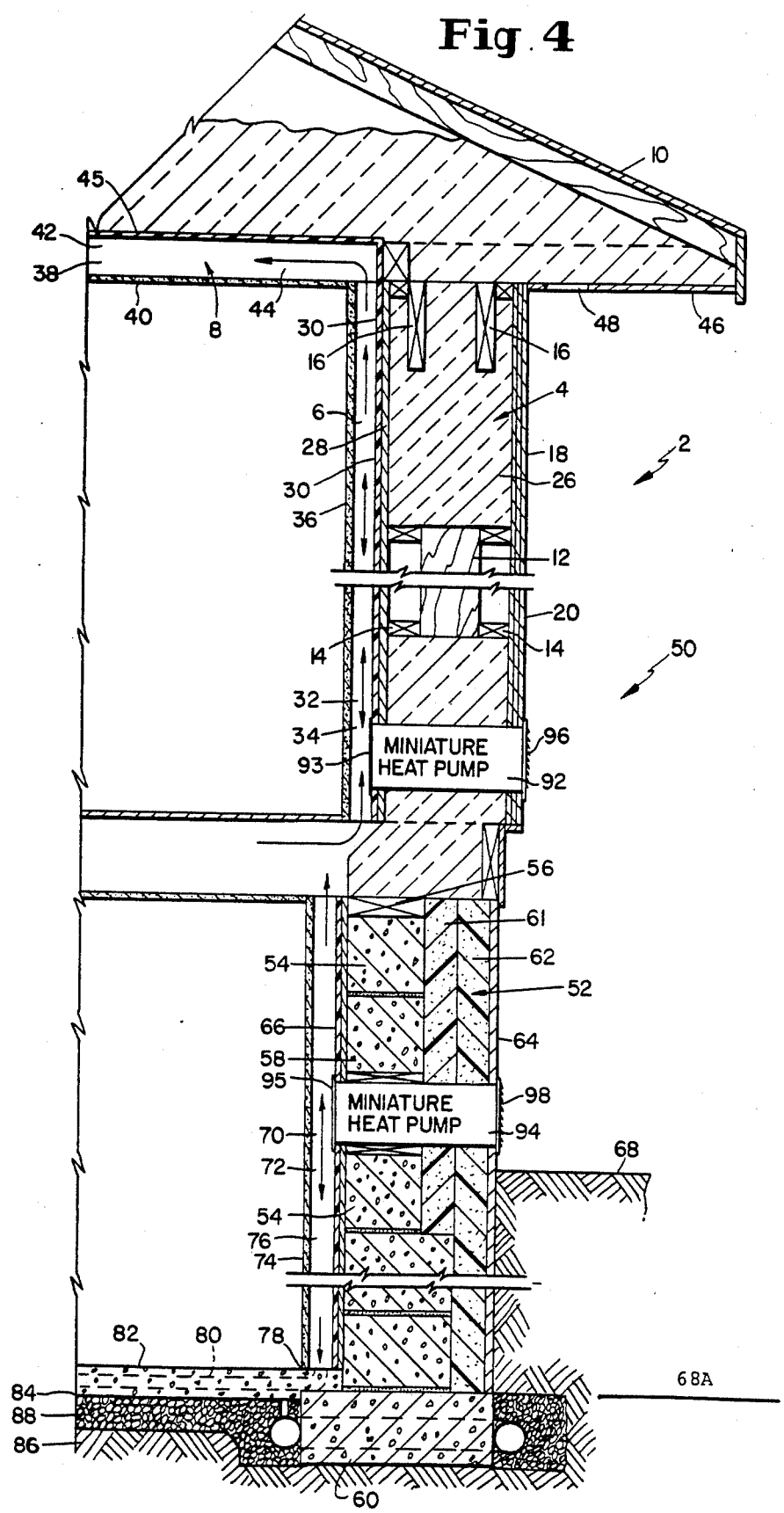
FIG. 4 shows two minature heat pump units residing in the outer wall structure of the instant low energy demand housing invention.

Referring specifically now to FIG. 4, miniature heat pump units 92 and 94 may be located within the outer wall structure 4. Such units are vented to the outdoors via vents 96 and 98 and have an air exchange port 93, 95 extending into the air passage way 34 and 76. A variable number of these miniature heat pumps may be used, while one such unit per floor in an ordinary building structure of the type generally disclosed may be sufficient. These units remain hidden within the outer wall structure and thus are space efficient. They promote the effectiveness of the conductive thermal effects of the circulating air in the enveloping passageways 80-76 and 34-42. For further controlling the extent of moisture build-up in the building structure, dehumidifier units may be incorporated either as stand alone units or part of said heat pump units.

While the invention has been explained by a detailed description of certain specific embodiments, it is understood that various modifications and substitutions can be made in any of them within the scope of the appended claims which are intended also to include equivalents of such embodiments.

What is claimed is:

1. A low energy demand structure comprising:
    a plurality of side walls, each of said side walls having
      a first exterior wall,
      a second middle wall having an inner surface and an outer surface and located interiorly of said first exterior wall and defining a space therebetween,
      a first group of vertical studs positioned in the space between said exterior and middle walls,
      a first relatively heavy insulating portion positioned between said exterior and middle walls and substantially filling the remaining space therein, said first exterior wall, said second middle wall said first group of vertical studs and said insulating portion forming in combination a relatively thick outer wall area,
      a third inner wall positioned interiorly of said second middle wall and defining a circulating side wall passageway therebetween,
      a second group of vertical studs positioned between said inner wall and said middle wall and defining a circulating side wall air passageway therein, said third inner wall, said second middle wall and said second group of vertical studs forming in combination a relatively thin inner wall area, and
      a first moisture impermeable sheet overlaying said inner or said outer surface of said middle wall,
    a roof structure having
      an exterior protective roof surface,
      a ceiling structure positioned below said exterior roof surface having an inner ceiling surface and defining a circulating roof air passageway between said inner ceiling surface and said exterior roof surface and in open communication with said circulating side wall air passageway,
      a second moisture impermeable sheet positioned between said circulating roof air passageway and said exterior roof surface,
    a foundation structure supporting said side walls and extending at least three feet below the normal frost depth line of the earth, said foundation structure having,
      a first supporting foundation wall,
      a second inner foundation wall positioned interiorly of said first foundation wall and defining a circulating foundation air passageway therebetween, said foundation air passageway being in open communication with said circulating side wall air passageway, and
      a third moisture impermeable sheet positioned between said first foundation wall and said second foundation wall;
    a lowermost floor slab positioned below the normal frost depth line of the earth, said floor slab having a circulating air passageway formed therein in open communication with said foundation air passageway, and
    a fourth moisture impermeable sheet positioned between said lowermost floor slab and the earth, wherein in combination said first, second, third and fourth moisture impermeable sheets form a substantially moisture proof seal across said side walls, roof, foundation and lowermost floor of said structure and wherein said lowermost floor slab is in conductive and radiative contact with the underlying earth so that air in said floor slab air passageway which is heated or cooled by the earth may be circulated throughout the air passageways in the foundation, side walls and roof of said structure.

2. The structure of claim 1 wherein:
   said foundation structure additionally comprises a third relatively heavy insulating portion overlaying substantially the entire exterior surface of said first supporting foundation wall.

3. The demand structure of claims 1 wherein:
said slab is comprised of concrete.

4. The demand structure of claim 1 wherein:
said relatively thick outer wall area including at least one heat pump unit vented through said first exterior wall and having an air exchange port protruding into said circulating side wall passageway for enhancing circulation of warm air therein.

5. The demand structure of claim 4 further comprising a dehumidifier unit for lessening moisture build-up in said air passageways.

* * * * *